(12) United States Patent
Jung et al.

(10) Patent No.: US 12,573,697 B2
(45) Date of Patent: Mar. 10, 2026

(54) BATTERY MODULE AND BATTERY PACK INCLUDING THE SAME

(71) Applicant: LG Energy Solution, Ltd., Seoul (KR)

(72) Inventors: Seyun Jung, Daejeon (KR); Jongyoung Lee, Daejeon (KR); Jong Ryeol Oh, Daejeon (KR); Beak San Lee, Daejeon (KR)

(73) Assignee: LG Energy Solution, LTD., Seoul (KR)

( * ) Notice: Subject to any disclaimer, the term of this patent is extended or adjusted under 35 U.S.C. 154(b) by 842 days.

(21) Appl. No.: 17/908,499

(22) PCT Filed: Oct. 19, 2021

(86) PCT No.: PCT/KR2021/014613
§ 371 (c)(1),
(2) Date: Aug. 31, 2022

(87) PCT Pub. No.: WO2022/114529
PCT Pub. Date: Jun. 2, 2022

(65) Prior Publication Data
US 2023/0124214 A1 Apr. 20, 2023

(30) Foreign Application Priority Data

Nov. 30, 2020 (KR) ........................ 10-2020-0164593

(51) Int. Cl.
*H01M 50/211* (2021.01)
*H01M 50/262* (2021.01)
*H01M 50/507* (2021.01)

(52) U.S. Cl.
CPC ....... *H01M 50/211* (2021.01); *H01M 50/262* (2021.01); *H01M 50/507* (2021.01)

(58) Field of Classification Search
None
See application file for complete search history.

(56) References Cited

U.S. PATENT DOCUMENTS

| | | | |
|---|---|---|---|
| 2011/0104555 A1 | 5/2011 | Han et al. | |
| 2013/0200700 A1 | 8/2013 | Ohkura et al. | |
| 2014/0154559 A1 | 6/2014 | Mori et al. | |
| 2014/0356691 A1 | 12/2014 | Ahn | |

(Continued)

FOREIGN PATENT DOCUMENTS

| | | |
|---|---|---|
| CN | 102770983 A | 11/2012 |
| CN | 103247772 A | 8/2013 |

(Continued)

*Primary Examiner* — Wyatt P McConnell

(74) *Attorney, Agent, or Firm* — Bryan Cave Leighton Paisner LLP

(57) ABSTRACT

A battery module including a battery cell stack, a busbar frame that is positioned in at least one end part of the battery cell stack, a housing that houses a cell block including the battery cell stack and the busbar frame, a pair of end plates that cover the front and rear surfaces of the cell block and are coupled to the housing, and an insulating cover that is positioned between the end plate and the battery cell stack. The insulating cover includes a first insulating cover and a second insulating cover. The first insulating cover covers the first busbar coupled to the busbar frame, and the second insulating cover covers the second busbar coupled to the busbar frame.

10 Claims, 6 Drawing Sheets

(56)         References Cited

U.S. PATENT DOCUMENTS

| | | | |
|---|---|---|---|
| 2019/0348720 A1 | 11/2019 | Oh et al. | |
| 2019/0389318 A1 | 12/2019 | Lee et al. | |
| 2020/0014005 A1* | 1/2020 | Lee ..................... | F16M 11/22 |
| 2021/0265705 A1 | 8/2021 | Min et al. | |
| 2021/0313657 A1 | 10/2021 | Park et al. | |

FOREIGN PATENT DOCUMENTS

| | | | |
|---|---|---|---|
| CN | 103855354 | A | 6/2014 |
| CN | 206758616 | U | 12/2017 |
| CN | 207852747 | U | 9/2018 |
| CN | 110114904 | A | 8/2019 |
| CN | 111029516 | A | 4/2020 |
| JP | 2018018753 | A | 2/2018 |
| JP | 2020504425 | A | 9/2020 |
| KR | 10-2011-0060480 | A | 6/2011 |
| KR | 10-2012-0138953 | A | 12/2012 |
| KR | 10-2014-0140744 | A | 12/2014 |
| KR | 10-2018-0099438 | A | 9/2018 |
| KR | 10-2033001 | B1 | 10/2019 |
| KR | 10-2020-0030225 | A | 3/2020 |
| KR | 10-2020-0054715 | A | 5/2020 |
| KR | 20200084450 | A | 7/2020 |
| KR | 10-2020-0102292 | A | 8/2020 |

* cited by examiner

【FIG. 1】
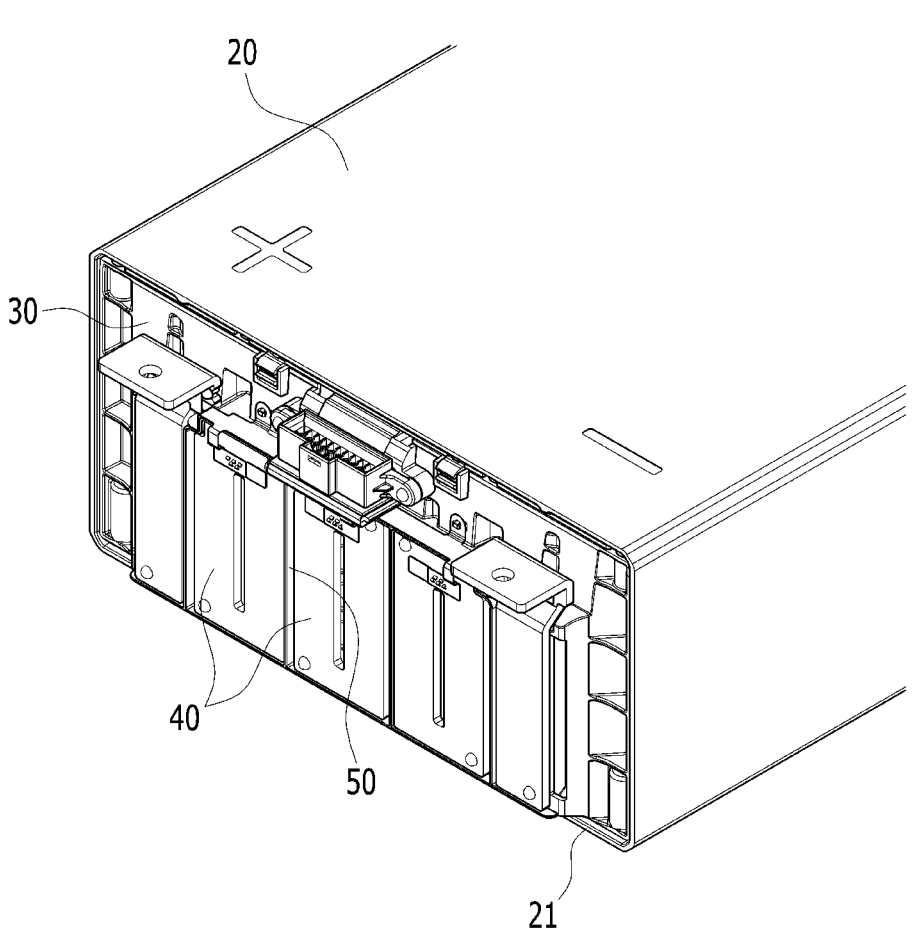

【FIG. 2】
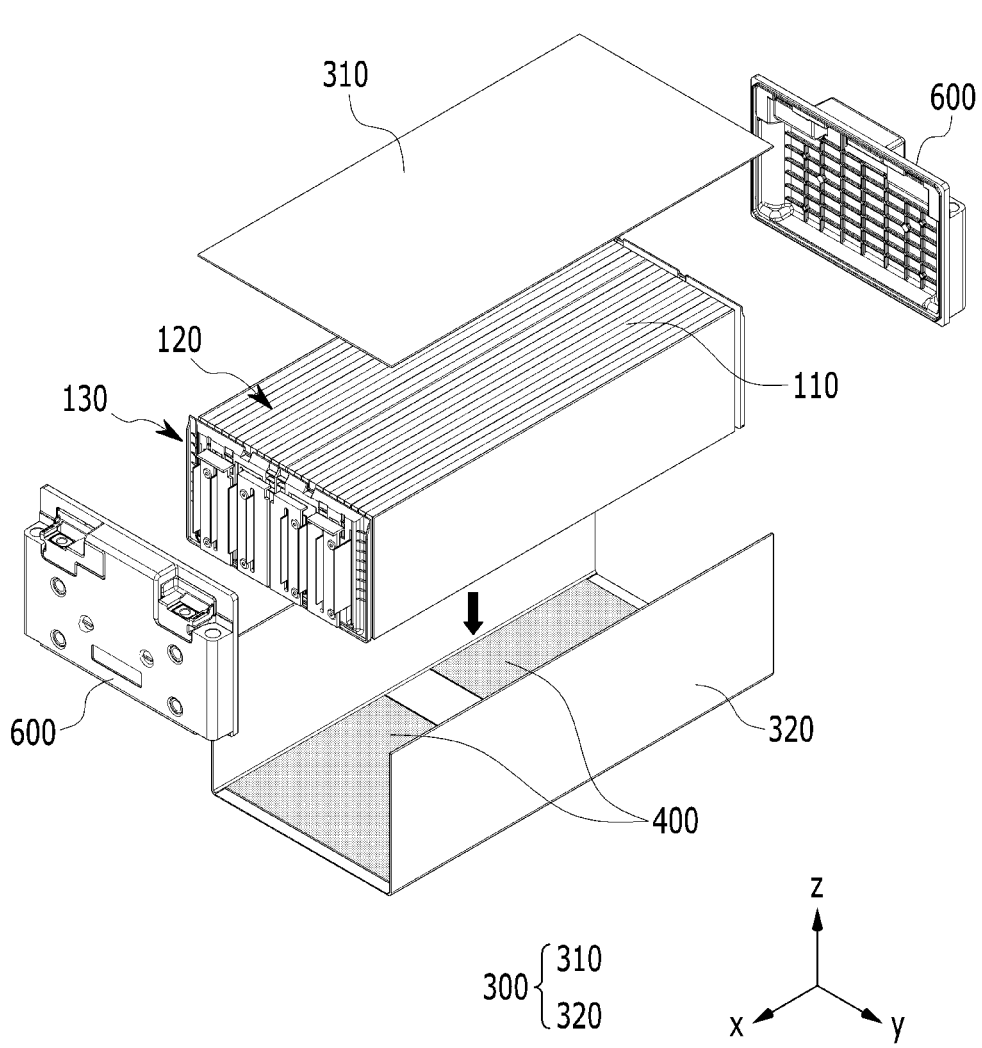

【FIG. 3】
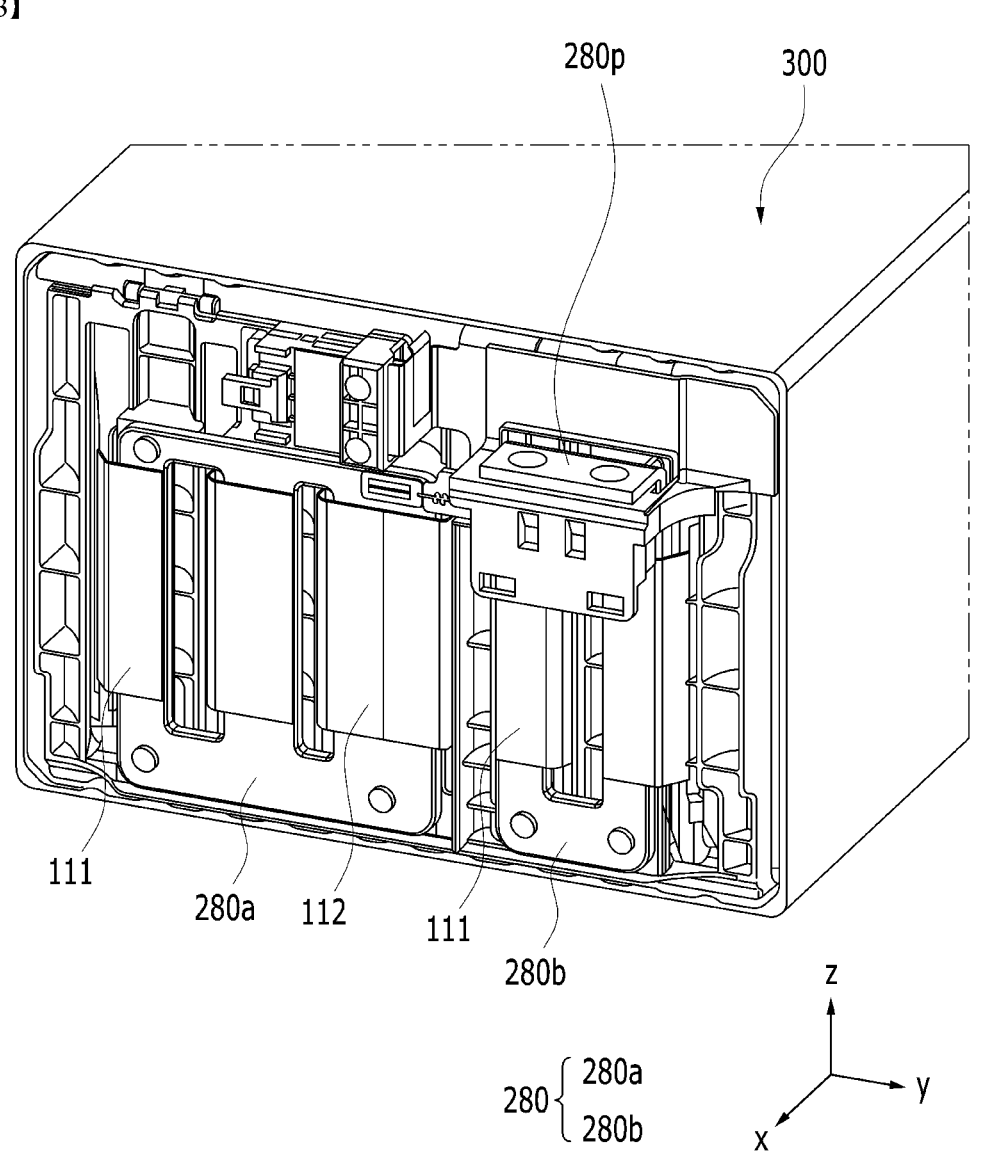

【FIG. 4】
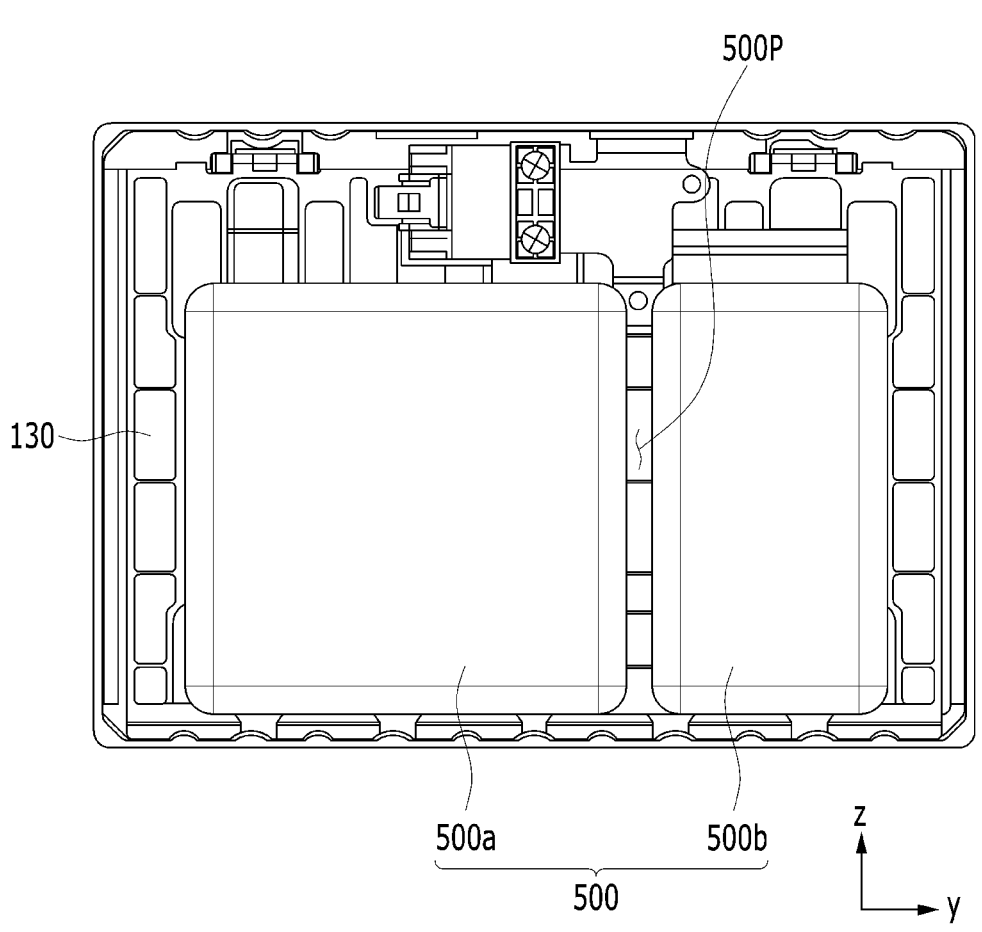

【FIG. 5】
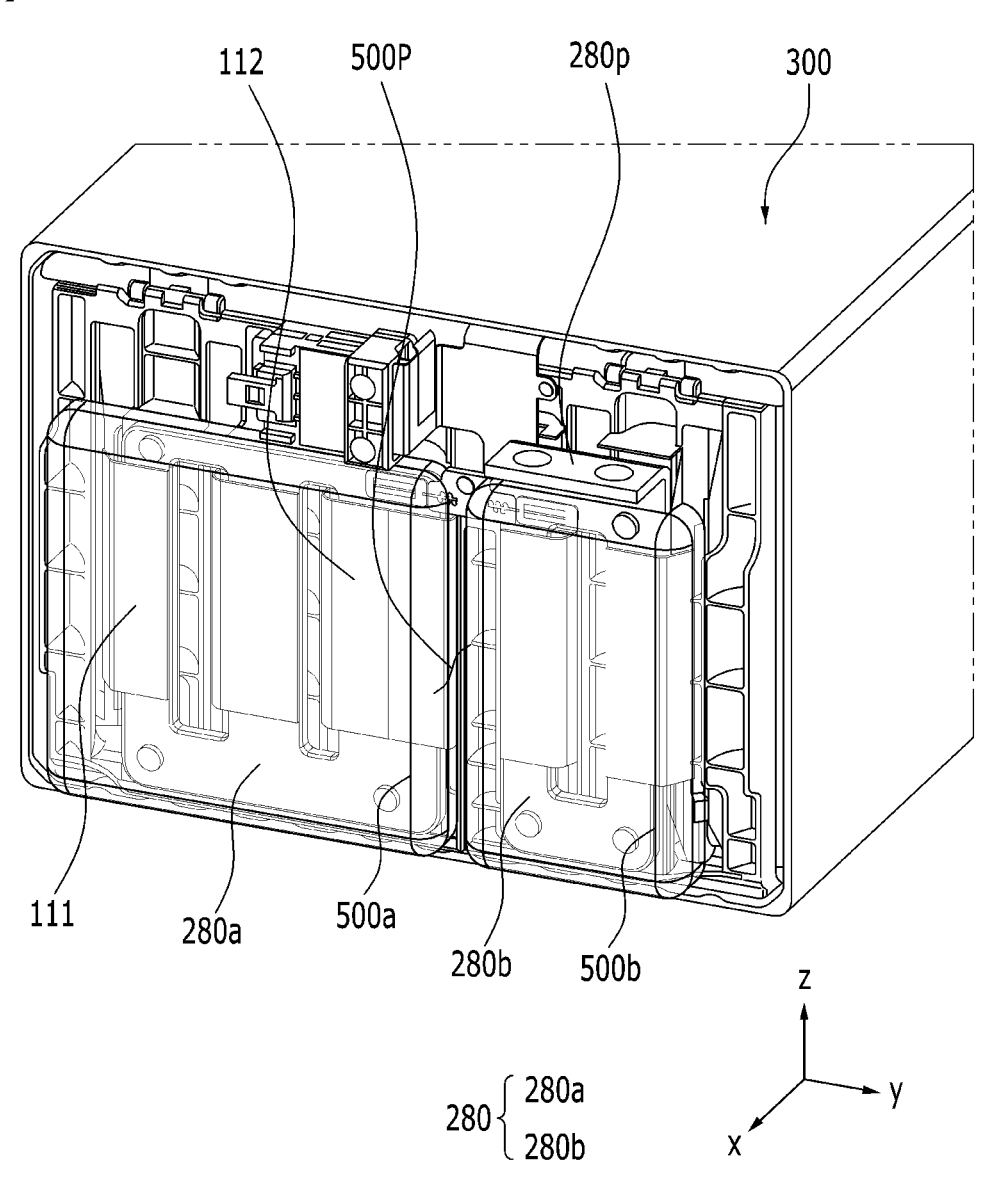

【FIG. 6】
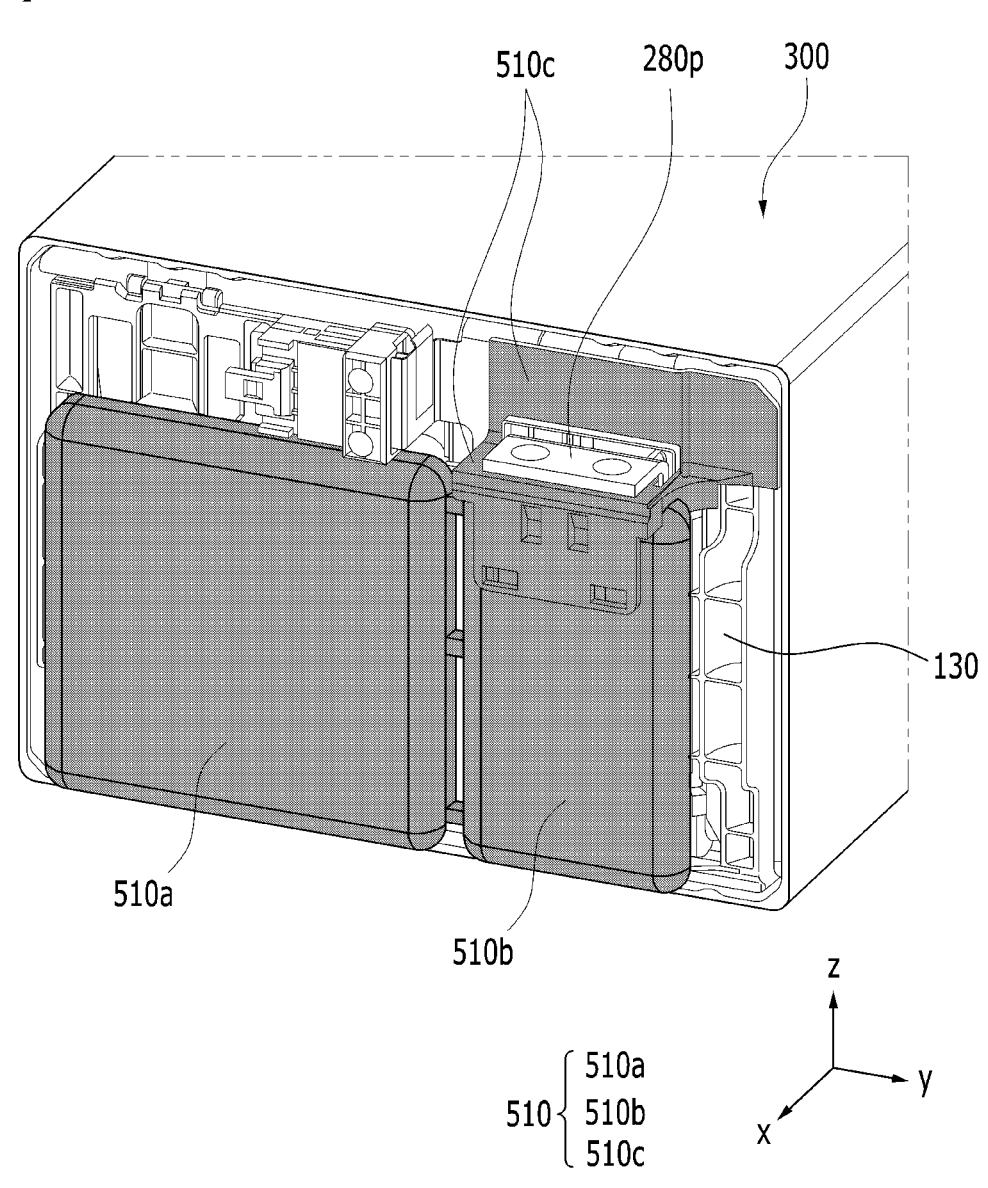

BATTERY MODULE AND BATTERY PACK INCLUDING THE SAME

CROSS-REFERENCE TO RELATED APPLICATIONS

This application is a US national phase of international application No. PCT/KR2021/014613 filed on Oct. 19, 2021, and claims the benefit of Korean Patent Application No. 10-2020-0164593 filed on Nov. 30, 2020, the disclosures of which are incorporated herein by reference in their entirety.

TECHNICAL FIELD

The present disclosure relates to a battery module and a battery pack including the same, and more particularly to a battery module having a short-circuit prevention structure between busbars, and a battery pack including the same.

BACKGROUND

A secondary battery attracts significant attention as an energy source in various products such as a mobile device and an electric vehicle. The secondary battery is a potent energy resource that can replace existing energy products that use fossil fuels, and is in the spotlight as an environment-friendly energy source because it does not generate by-products from energy use.

Recently, along with a continuous rise in the need for a large-capacity secondary battery structure, including the utilization of the secondary battery as an energy storage source, there is a growing demand for a battery pack of a multi-module structure, which is an assembly of battery modules in which a plurality of secondary batteries are connected in series/parallel.

Meanwhile, when a plurality of battery cells are connected in series/parallel to configure a battery pack, a common method of configuring a battery module composed of at least one battery cell includes adding other components to the at least one battery module.

The battery module may include a battery cell stack in which a plurality of battery cells are stacked, a housing that houses the battery cell stack, and a busbar frame that covers the front and rear surfaces of the battery cell stack.

FIG. 1 is a diagram showing a conventional battery module structure.

As illustrated in FIG. 1, the conventional battery module may include a housing 20 that houses the battery cell stack, a busbar frame 30 that covers the front and rear surfaces of the battery cell stack, a plurality of busbars 40 that is attached to the outer surface of the busbar frame, and a partition wall 50 that protrudes from the busbar frame 30 to partition the plurality of busbars 40. In this configuration, only one partition wall 50 is formed between adjacent busbars 40 among the plurality of busbars, and the interval between the busbars 40 may also be very narrow. Further, the interval between the housing bottom part 21 and the busbars 40 may also be very narrow.

Moisture generation inside the battery module and electrolyte leakage from the battery cells may occur, and these liquids may corrode the busbars and deposits are collected between the busbars, which causes a short circuit between busbars. When a short circuit occurs, the battery module is more likely to catch fire, which can lead to safety issues. As a result, a busbar and a busbar frame capable of preventing a short circuit between busbars in advance are essentially required.

DETAILED DESCRIPTION

It is an objective of the present disclosure to provide a battery module that can prevent a short-circuit between busbars, and a battery pack including the same.

The objectives of the present disclosure are not limited to the aforementioned objectives, and other objectives which are not described herein should be clearly understood by those skilled in the art from the following detailed description.

According to one exemplary embodiment of the present disclosure, there is provided a battery module comprising: a battery cell stack in which a plurality of battery cells are stacked, a busbar frame that is positioned in at least one end part of the battery cell stack, a housing that houses a cell block including the battery cell stack and the busbar frame, an end plate that covers the front and rear surfaces of the cell block and is coupled to the housing, and an insulating cover that is positioned between the end plate and the battery cell stack, wherein the insulating cover comprises a first insulating cover and a second insulating cover, and wherein the first insulating cover covers the first busbar coupled to the busbar frame, and the second insulating cover covers the second busbar coupled to the busbar frame.

The first busbar may have a larger area than the second busbar.

The second busbar may be a terminal busbar.

The insulating cover may further comprise a third insulating cover, and the third insulating cover is positioned at a lower end of a protrusion part formed at one end of the terminal busbar.

The first insulating cover and the second insulating cover may respectively shield the space where the first busbar and the second busbar are spaced apart from each other, and the first busbar and the second busbar, respectively, thereby blocking a short circuit between the first busbar and the second busbar.

The first insulating cover and the second insulating cover may be coupled to the busbar frame.

The first insulating cover and the second insulating cover may be respectively coupled to the busbar frame using an adhesive.

The first insulating cover and the second insulating cover may be respectively coupled to the busbar frame by a fastening member.

The first insulating cover and the second insulating cover may be coupled to the end plate by an adhesive.

According to another exemplary embodiment of the present disclosure, there is provided a battery pack comprising the above-mentioned battery module.

A battery module and a battery pack including the same according to embodiments of the present disclosure can prevent a short circuit between busbars and ensure the stability of the battery module, through a structure for securing the interval between busbars, a double partition wall structure between busbars, and a structure for securing the interval between the busbars and the housing bottom part.

The effects of the present disclosure are not limited to the effects mentioned above and additional other effects not described above will be clearly understood from the description of the appended claims by those skilled in the art.

BRIEF DESCRIPTION OF THE DRAWINGS

FIG. 1 is an illustration of a conventional battery module structure;

FIG. 2 is a perspective view of a battery module according to an exemplary embodiment of the present disclosure;

FIG. 3 is a partial perspective view of a battery module in which components of the battery module of FIG. 2 are combined;

FIG. 4 is a front view of the battery module of FIG. 3 where an insulating cover is attached to the battery module;

FIG. 5 is a perspective view of the battery module of FIG. 4 showing the projection of the insulating cover onto the busbar of the battery module; and FIG. 6 is a partial perspective view of a battery module according to another exemplary embodiment of the present disclosure.

DETAILED DESCRIPTION

Hereinafter, various embodiments of the present disclosure will be described in detail with reference to the accompanying drawings so that those skilled in the art can easily carry them out.

The present disclosure may be modified in various different ways, and is not limited to the embodiments set forth herein.

A description of parts not related to the description will be omitted herein for clarity, and like reference numerals designate like elements throughout the description.

Further, in the drawings, the size and thickness of each element are arbitrarily illustrated for convenience of description, and the present disclosure is not necessarily limited to those illustrated in the drawings. In the drawings, the thickness of layers, regions, etc. are exaggerated for clarity. In the drawings, for convenience of description, the thicknesses of some layers and regions are exaggerated.

In addition, it will be understood that when an element such as a layer, film, region, or plate is referred to as being "on" or "above" another element, it can be directly on the other element or intervening elements may also be present. In contrast, when an element is referred to as being "directly on" another element, it means that other intervening elements are not present. Further, the word "on" or "above" means disposed on or below a reference portion, and does not necessarily mean being disposed "on" or "above" the reference portion toward the opposite direction of gravity.

Further, throughout the specification, when a portion is referred to as "including" a certain component, it means that the portion can further include other components, without excluding the other components, unless otherwise stated.

Further, throughout the specification, when referred to as "planar", it means when a target portion is viewed from the upper side, and when referred to as "cross-sectional", it means when a target portion is viewed from the side of a cross section cut vertically.

FIG. 2 is a perspective view of a battery module according to an exemplary embodiment of the present disclosure. FIG. 3 is a partial perspective view of a battery module in which components of the battery module of FIG. 2 are combined.

As illustrated in FIG. 2, the battery module according to an exemplary embodiment of the present disclosure includes a battery cell stack 120 formed by stacking a plurality of battery cells 110, a pair of busbar frames 130 mounted on both ends of the battery cell stack 120, a frame 300 for housing the battery cell stack 120, and a pair of end plates 600 that wrap, at both end parts, a cell block in which the battery cell stack 120 and the busbar frame 130 are combined.

The battery cell 110 is preferably a pouch type battery cell. In the present embodiment, the battery cell stack 120 is stacked along the y-axis direction of FIG. 2, is arranged inside the frame 300 in the z-axis direction, and can be cooled by a thermal conductive resin layer 400 formed between the bottom part of the frame 300 and the battery cell stack 120.

The frame 300 for housing the battery cell stack 120 may include an upper plate 310 and a housing 320. The housing 320 includes a plurality of unit housing parts, and the upper plate 310 may be formed in a plate-shaped structure that covers the upper part of the battery cell stack 120 mounted on the housing 320. The housing 320 wraps the lower surface and both side surfaces of the battery cell stack 120, and the upper plate 310 may wrap the remaining upper surface (z-axis direction). The upper plate 310 and the housing 320 are coupled by welding or the like where the edge parts corresponding to each other are in contact, so that a structure that covers the battery cell stack 120 vertically and horizontally can be formed. The battery cell stack 120 can be physically protected through the upper plate 310 and the housing 320. For this purpose, the upper plate 310 and the housing 320 may include a metal material having a predetermined strength.

Meanwhile, although not specifically shown in the figure, the frame member 300 according to a modified example may be a mono frame in the form of a metal plate in which the upper surface, the lower surface, and both sides are integrated. That is, the frame structure may not be a structure in which the housing 320 and the upper plate 310 are combined to each other, but may be manufactured by extrusion molding and have a structure in which the upper surface, the lower surface, and both sides are integrated.

Busbar frames 130 may be positioned on the open first side (x-axis direction) and the open second side (direction opposite to the x-axis) of the battery cell stack 120 to cover the battery cell stack 120, and at the same time, serve to guide the connection between the battery cell stack 120 and the external device. Specifically, a busbar 280 may be mounted on the busbar frame 130, and the electrode leads 111 and 112 of the battery cells 110 may pass through a slot formed in the busbar frame 130 and then be bent to be joined to the busbar 280. Thereby, the battery cells 110 constituting the battery cell stack 120 may be connected in series or in parallel.

The busbar 280 according to the present embodiment may include a first busbar 280a and a second busbar 280b, and the area of the first busbar 280a may be larger than the area of the second busbar 280b. The second busbar 280b may be a terminal busbar, and a protrusion part 280p at one end of the second busbar 280b may be bent from the z-axis direction to the x-axis direction.

The protrusion part 280p of the second busbar 280b may be exposed to the outside of the battery module 10. The second busbar 280b can be connected to another battery module or a Battery Disconnect Unit (BDU) to form a high voltage (HV) connection. Here, the HV connection serves as a power source for supplying power, and refers to a connection between battery cells or a connection between battery modules.

The end plate 600 may be positioned on the open first side (x-axis direction) and the open second side (direction opposite to the x-axis) of the frame member 300 to cover the battery cell stack 120. The end plate 600 can physically protect the battery cell stack 120 and other electrical components from external impact. A busbar frame 130 may be positioned between the battery cell stack 120 and the end plate 600.

An insulating cover for electrical insulation may be formed between the busbar frame 130 and the end plate 600. Hereinafter, the insulating cover according to the present embodiment will be described in detail.

FIG. 4 is a front view of the battery module of FIG. 3 where the insulating cover is attached to the battery module. FIG. 5 is a perspective view of a projection of the insulating cover on the battery module of FIG. 4 where the insulating cover covers the busbar.

As illustrated in FIGS. 2 to 4, the battery module according to the present embodiment includes an insulating cover 500 positioned between the end plate 600 and the battery cell stack 120. The insulating cover 500 according to the present embodiment includes a first insulating cover 500a and a second insulating cover 500b, wherein the first insulating cover 500a covers the first busbar 280a coupled to the busbar frame 130, and the second insulating cover 500b may cover the second busbar 280b coupled to the busbar frame 130.

In the case of the insulating cover according to a comparative example, there is no structure that physically blocks two busbars adjacent to each other. Therefore, the busbars may be easily corroded due to the outflow of the electrolyte solution and/or the inflow of moisture, or a short circuit between adjacent busbars may be easily formed by foreign materials. If a short circuit between the busbars occurs in this way, it may cause module ignition. On the contrary, according to the present embodiment, the separation space 500P between the first busbar 280a and the second busbar 280b and the first busbar 280a and the second busbar 280b can be shielded when the first busbar 280a and the second busbar 280b adjacent to each other are covered by the first insulating cover 500a and the second insulating cover 500b, respectively. Specifically, as shown in FIG. 5, the first insulating cover 500a can cover the first busbar 280a such that the first insulating cover 500a wraps around the front surface of the first busbar 280a in the x-axis direction, and all four side surfaces of the first busbar 280a, and the second insulating cover 500b can cover the second busbar 280b such that the second insulating cover 500b wraps around the front surface of the second busbar 280b in the x-axis direction, and all four side surfaces of the second busbar 280b. With this structure, it is possible to physically block the electrolyte solution from flowing into the first busbar 280a and the second busbar 280b even when the electrolyte solution flows out into the separation space 500P between the first busbar 280a and the second busbar 280b, which face each other. According to the present embodiment, it is possible to protect the busbar 280 from foreign material and moisture as well as the electrolyte solution.

In other words, the first insulating cover 500a and the second insulating cover 500b can shield the space 500P, which is formed when the first busbar 280a and the second busbar 280b are spaced apart from each other, from the first busbar 280a and the second busbar 280b, thereby blocking a short circuit between the first busbar 280a and the second busbar 280b.

The first insulating cover 500a and the second insulating cover 500b can be coupled to the busbar frame 130. Each of the first insulating cover 500a and the second insulating cover 500b may be coupled to the busbar frame 130 using an adhesive, or may be coupled to the busbar frame 130 by a fastening member. The fastening member may be coupled using a hole, a hook, or the like, but is not limited thereto and may be fastened by various known methods.

FIG. 6 is a partial perspective view of a battery module according to another exemplary embodiment of the present disclosure. The embodiment of FIG. 6 is almost the same as the embodiment illustrated in FIGS. 4 and 5, and only the differences between these drawings will be described below.

As illustrated in FIGS. 3 and 6, the insulating cover 510 according to the present embodiment includes a first insulating cover 510a for covering the first busbar 280a and a second insulating cover 510b for covering the second busbar 280b, and may further include a third insulating cover 510c positioned at the lower end of the protrusion part 280p at one end of the terminal busbar 280b.

The third insulating cover 510c according to the present embodiment may serve to insulate the terminal busbar 280b. The terminal busbar 280b may be connected to another battery module or a battery disconnect unit (BDU) to form a high voltage (HV) connection.

The third insulating cover 510c may be integrally formed with the second insulating cover 510b.

In addition to the differences described above, all the contents described in the embodiments of FIGS. 4 and 5 are also applicable to the present embodiment.

The above-mentioned battery module can be included in the battery pack. The battery pack may have a structure in which one or more of the battery modules according to the exemplary embodiments of the present disclosure are packed together with a battery management system (BMS) and a cooling device that control and manage the battery's temperature, voltage, etc.

The above-mentioned battery module and the battery pack including the same can be applied to various devices. Such a device may be applied to a vehicle means such as an electric bicycle, an electric vehicle, or a hybrid vehicle, but the present disclosure is not limited thereto, and is applicable to various devices that can use a battery module, which also falls under the scope of the present disclosure.

Although the invention has been shown and described with reference to the preferred embodiments, the scope of the present disclosure is not limited thereto, and numerous other modifications and embodiments can be devised by those skilled in the art, without departing from the spirit and scope of the principles of the invention described in the appended claims. Further, these modified embodiments should not be understood individually from the technical spirit or perspective of the present disclosure.

The invention claimed is:

1. A battery module comprising:
 a battery cell stack comprising a plurality of battery cells,
 a busbar frame positioned on at least one end part of the battery cell stack,
 a housing comprising a cell block, wherein the cell block comprises the battery cell stack and the busbar frame,
 a pair of end plates covering the front and rear surfaces of the cell block, wherein each of the pair of end plates is coupled to the housing, and
 a pair of insulating covers comprising a first insulating cover and a second insulating cover,
 wherein each of the first and second insulating covers is between a same one of the pair of end plates and the battery cell stack, wherein the first insulating cover covers a first busbar coupled to the busbar frame, the second insulating cover covers a second busbar coupled to the busbar frame.

2. The battery module according to claim 1, wherein: the first busbar has a larger area than the second busbar.

3. The battery module according to claim 2, wherein: the second busbar is a terminal busbar.

4. The battery module according to claim 3, wherein: the insulating cover further comprises a third insulating cover, and the third insulating cover is positioned at a lower end of a protrusion part formed at one end of the terminal busbar.

5. The battery module according to claim 1, wherein: the first insulating cover and the second insulating cover shield a space between the first busbar and the second busbar from the first busbar and the second busbar, respectively.

6. The battery module according to claim 1, wherein: the first insulating cover and the second insulating cover are coupled to the busbar frame.

7. The battery module according to claim 6, further comprising:
an adhesive,
wherein the adhesive connects the first insulating cover and the second insulating cover to the busbar frame.

8. The battery module according to claim 6, further comprising:
a fastening member,
wherein the fastening member connects the first insulating cover and the second insulating cover to the busbar frame.

9. The battery module according to claim 1, further comprising:
an adhesive,
wherein the adhesive connects the first insulating cover and the second insulating cover to each of the pair of end plates, respectively.

10. A battery pack comprising the battery module according to claim 1.

\* \* \* \* \*